UNITED STATES PATENT OFFICE.

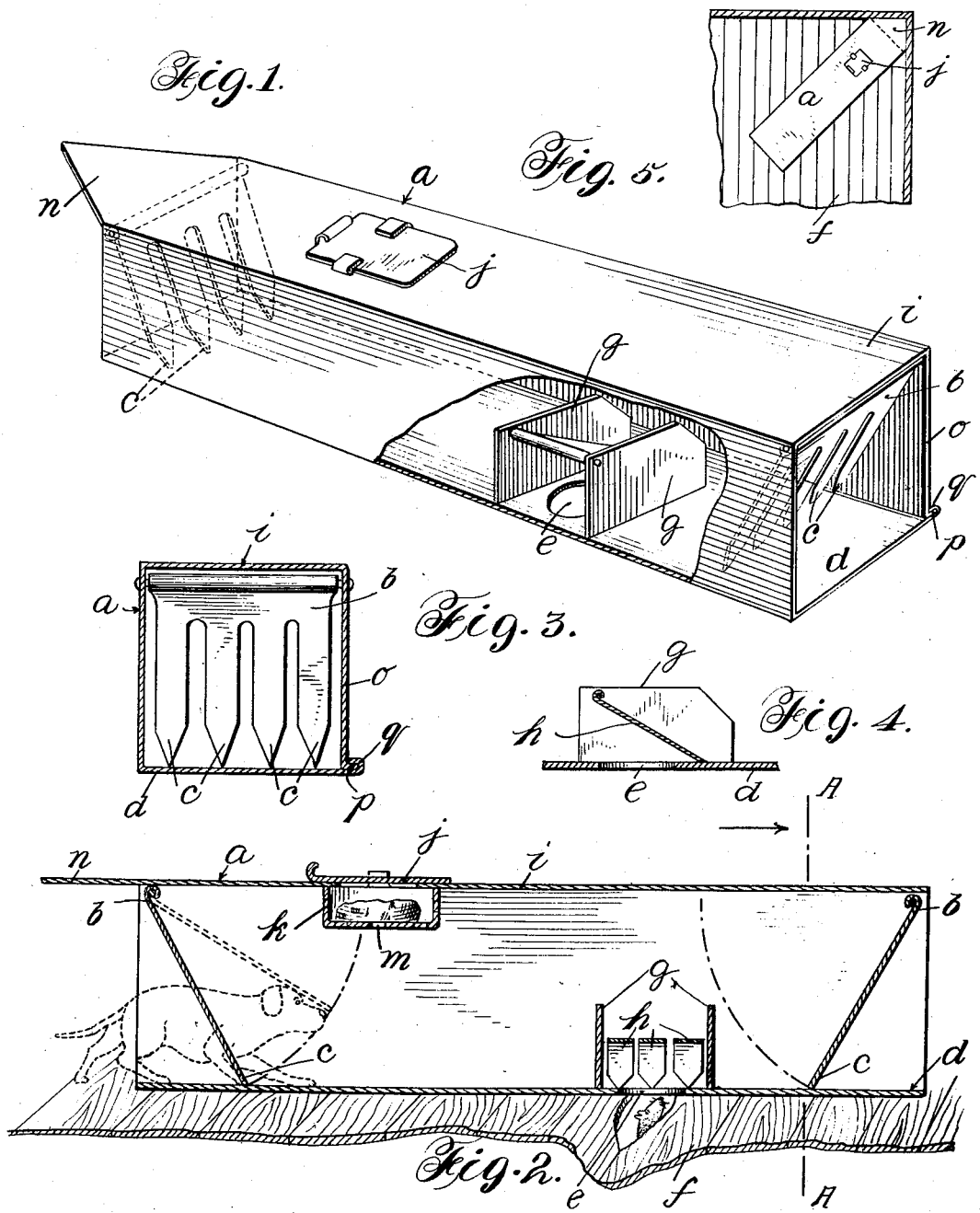

CHARLES H. SHOUP, OF CORBIN, KANSAS.

ANIMAL-TRAP.

934,469.

Specification of Letters Patent. Patented Sept. 21, 1909.

Application filed November 18, 1908. Serial No. 463,142.

*To all whom it may concern:*

Be it known that I, CHARLES H. SHOUP, a citizen of the United States, residing at Corbin, in the county of Sumner and State of Kansas, have invented certain new and useful Improvements in Animal-Traps, of which the following is a specification, reference being had to the accompanying drawings.

My invention relates to improvements in animal traps; and an object of my invention is to provide an animal trap which will be simple in construction, comparatively cheap in manufacture and efficient in use.

Another object of my invention is to provide an animal trap which will be adapted for the catching of animals from the size of a mouse to the size of a dog.

In the drawings illustrating the principle of my invention and the best mode now known to me of applying that principle, Figure 1 is a perspective view of my new animal trap, part of the wall being broken away to show the interior construction; Fig. 2 is a central longitudinal section; Fig. 3 is a section on the line A—A of Fig. 2; Fig. 4 is a detail showing the gate or wicket over the opening in the bottom of the trap; and Fig. 5 is a detail showing the trap placed in the corner of a room.

My new animal trap comprises a casing $a$ which is four-sided and open at both ends and which, therefore, resembles an ordinary passage way or conduit. This open-ended feature leads the animal to believe that the passage is open at both ends and that it may emerge at the other end of the conduit. Each end of the casing or conduit $a$ is controlled by a wicket $b$, which is adapted to swing inwardly but which cannot swing outwardly because of its length (see Fig. 4). The wickets $b$ are each formed with a series of prongs or teeth $c$ which would catch the animal provided it forced itself under the wicket from the inside of the trap. The bottom $d$ of the casing is formed with a hole $e$, which may be placed over a hole in the floor $f$, as is best shown in Fig. 2. Extending transversely of the trap are two plates $g$, one on each side of the opening $e$; and between these plates $g$ is mounted free to swing a wicket $h$. Obviously, a rat passing through the holes $f$ and $e$ into the trap by raising the wicket $h$ cannot return, as the latter falls by gravity and prevents it from gaining access to the hole $e$ again.

In the top $i$ of the housing or casing $a$ is mounted a slide $j$ which serves as a cover for the bait-box $k$. The latter is formed with a perforated bottom $m$. The animal having been caught in the trap, the latter is placed in a sack and then turned upside down, whereupon the wickets $b$ will fall inwardly and the animal will run out into the sack through the end of the trap. One end $n$ of the top $i$ of the trap is made V-shaped, as is best shown in Figs. 1 and 5; and this end $n$ may be placed in the corner of a room, when the animal's hole is in a corner. When the hole is in the side of the room, the opposite end will be placed over the hole.

The side wall $o$ is formed with an outwardly extending flange $p$ which engages in a groove or channel formed by doubling back upon itself, as at $q$, one edge of the bottom $d$. By pressing the side wall $o$ inwardly, it may be disengaged from the bottom $q$ so as to permit an inspection of the inside of the trap, the housing of which is preferably made of sheet metal.

I claim:

1. An animal trap consisting of the combination of a housing open at its ends and formed with a hole in its bottom; a pair of wickets, one for each of said open ends and controlling the same, said wickets being free to swing inwardly into said housing but being held against swinging outwardly therefrom; a pair of plates which extend transversely in said housing and between which lies said hole; and a wicket mounted over said hole and free to swing between said plates.

2. An animal trap consisting of the combination of a housing open at its ends and formed with a hole in its bottom; a pair of gravitating non-return wickets which control said open ends and prevent passage therethrough from the inside of the trap, while permitting entrance to the inside of the trap through said open ends; and a gravitating non-return wicket mounted over the hole in the bottom of said housing, said wicket permitting access to be gained to the inside of the trap through said hole, while preventing passage from the inside of the trap to the outside thereof through said hole.

In testimony whereof I have hereunto set my hand at Wellington, Kansas, this 12" day of November, A. D., 1908, in the presence of the two undersigned witnesses.

CHARLES H. SHOUP.

Witnesses:
 IVAN D. ROGERS,
 W. H. SCHULTE.